United States Patent [19]

Spyropoulos et al.

[11] Patent Number: 5,017,297

[45] Date of Patent: May 21, 1991

[54] MICROEMULSIONS FOR TREATING FIBROUS MATERIALS CONTAINING THE REACTION PRODUCT OF A SILANE AND A SILOXANE

[75] Inventors: Konstantinos Spyropoulos, Geneva, Switzerland; Paul A. Yianni, Limal, Belgium

[73] Assignee: Dow Corning Limited, Barry, Wales

[21] Appl. No.: 395,232

[22] Filed: Aug. 17, 1989

[30] Foreign Application Priority Data

Aug. 17, 1988 [GB] United Kingdom ............ 8819569

[51] Int. Cl.$^5$ ............ D06M 15/643; D06M 15/65; C08K 5/04
[52] U.S. Cl. .................... 252/8.8; 252/8.6; 252/174.15; 524/838; 428/391
[58] Field of Search ............ 252/8.6, 8.7, 8.75, 252/8.8, 8.9, 174.15; 524/838; 428/391

[56] References Cited

U.S. PATENT DOCUMENTS

| | | | |
|---|---|---|---|
| 4,098,701 | 7/1978 | Burril et al. | 252/8.6 |
| 4,359,545 | 11/1982 | Ona et al. | 252/8.8 |
| 4,412,035 | 10/1983 | Kurita | 524/838 |
| 4,757,121 | 7/1988 | Tanaka | 252/8.6 |

FOREIGN PATENT DOCUMENTS

| | | |
|---|---|---|
| 0138192 | 11/1988 | European Pat. Off. |
| 1289748 | 9/1972 | United Kingdom |
| 1296136 | 11/1972 | United Kingdom |
| 1491747 | 11/1977 | United Kingdom |
| 2036052 | 6/1980 | United Kingdom |
| 2098989 | 8/1981 | United Kingdom |

OTHER PUBLICATIONS

*Epoxy Resins, Chemistry and Technology*, May, Clayton A., Marcel Dekker, 1973.

*Primary Examiner*—Paul Lieberman
*Assistant Examiner*—J. E. Darland
*Attorney, Agent, or Firm*—George A. Grindahl

[57] ABSTRACT

Microemulsions are provided in which the oil phase comprises a reaction product of an organosilicon compound having amino groups and an organosilicon compound having epoxy groups, wherein the reaction product has at least one amino group and two silicon-bond —OR groups. A method for making the microemulsions which comprises reacting the two organosilicon compounds sufficiently to allow the reaction of some of the amine groups with the epoxy groups, but avoiding the excessive crosslinking of the components and their application in the treatment of fibrous materials is also described.

11 Claims, No Drawings

MICROEMULSIONS FOR TREATING FIBROUS MATERIALS CONTAINING THE REACTION PRODUCT OF A SILANE AND A SILOXANE

This invention relates to emulsions for treating fibrous materials, especially textile materials, and more particularly to silicone containing emulsions. The invention also relates to a method of making these emulsions.

Treatment of fibrous materials, especially textile materials with silicone compositions has been known for some time. Silicone compositions are employed to impart certain characteristics, for example softness, handle, water repellency, silky feel, non-pilling, shrink resistance, crease recovery and oily soil release. Such compositions may be applied from solvent or from aqueous dispersions or emulsions. Having regard to environmental considerations and the cost of recovering organic solvents, the latter method is preferred. Fibrous materials which may be treated include natural and synthetic textile fibres and fabrics and fibre fills.

When it is desired to impart the property of crease recovery, it is preferred that the applied compositions are those which produce an elastomeric finish on the fibres. Compositions in emulsion form which produce elastomeric silicone finishes upon drying or curing after application to a substrate are known. Such compositions are usually based on reactive siloxane polymers or reactive silanes, which can crosslink e.g. upon exposure to atmospheric conditions or upon heating in the presence of a catalyst and optionally a crosslinking agent. Examples of such systems are found for example in G.B. Patent Specifications 1 570 983, and 2 036 052. Due to the reactivity of the components the silicone elastomer-forming compositions are not stable for a long period, resulting in a limited bath life during use. G.B. Patent Specification 1 296 136 for example discloses a process for treating synthetic organic fibres which includes the application of a certain composition on the fibres, followed by curing the treated fibres. The composition contains a mixture of certain aminosiloxanes and polyepoxides, a mixture of certain liquid epoxysiloxanes and polyamines or a mixture of said aminosiloxanes and said epoxysilanes. The specification recommends that the amine-containing compound and the epoxy-containing compound be mixed only a short time before use. These compositions need to be supplied in more than one package. Such multi-package compositions would for example have the reactive group containing silicone in one part and the catalyst and/or crosslinker in another part. This arrangement tends to improve the shelf life of the composition by avoiding the premature formation of elastomer particles. For this reason the above-mentioned G.B. Specification 1 296 136 also recommends that after mixing or dispersing the components the resulting composition is applied to the fibres, preferably at room temperature, in as much as heating tends to cause premature crosslinking and precipitation of the polymers. Equally G.B. Specification 1 491 747 recommends that the composition for treating of synthetic fibres which comprises 1 part of an aminosilane and 1 to 20 parts of an epoxysiloxane is to be applied at temperatures below 50° C. Premature reaction of the aminocontaining and epoxycontaining components is thus to be avoided. When the different packages are mixed together, a bath with limited life is obtained. Such limitation is disadvantageous. Attempts to overcome this problem include the addition of cure inhibitors in the treating bath. Such inhibitors may be added to the bath upon mixing the emulsions together, or may be provided in one of the packages of the composition. Examples are given in G.B. Patent Specifications 1 289 748 and 2 068 989. According to the latter Specification thickeners are included, which is not usually desirable in treating fibrous materials.

There has therefore existed a need for an elastomer-forming composition which can be supplied as a one package product and which exhibits an acceptable bath life during use.

Compositions which may be supplied in one package are known and are based on relatively unreactive components. However, although exhibiting an improved shelf life, they also give an inferior elastomeric finish to the fibrous materials. In order to withstand repeated washing of the treated fibrous materials, it is desirable that the treatment be substantive. To achieve this, fairly reactive materials are used e.g. components containing amino functional groups, which bond the elastomeric finish to the substrate. There is, therefore, a need to provide treating compositions for fibrous materials which are supplied in one package and are based on reactive components but which also give an improved bath-life.

Providing oil-in-water emulsions has been proposed to provide a more stable system. However, the disadvantages mentioned above are not overcome by the use of emulsions. This is confirmed in G.B. Patent Specifications 1 296 136 and 1 491 747 referred to above. We have now found that providing certain elastomer-forming silicone compositions in micro-emulsion form gives a stable product. Moreover we have unexpectedly found that satisfactory treatment of fibrous materials can be achieved by allowing certain amino-containing silicone components, and certain epoxycontaining silicone components, to react together to some extent prior to treating the fibrous materials. By using a microemulsion technique in combination with the prereaction a stable composition is obtained which is useful in the treatment of fibrous materials.

Microemulsions of organosiloxane compounds of the oil-in-water type are known and are described for example in European Patent Application E.P. 138 192. With microemulsions where herein used is meant emulsions which have a particle size of less than 0.14 ppm. Preferably these microemulsions are translucent or transparent. The compounds described therein, however, do not provide elastomeric finishes. Preparing microemulsions of compounds with reactive groups which are able to form elastomeric finishes is also a hitherto unknown process. Major problems may occur if the conditions are not well controlled as the reactive components can give rise to small gel like particles, which are unacceptable in the treatment of fibrous materials.

According to the present invention there is provided an oil-in-water microemulsion of an elastomer-forming silicone composition, comprising (I) a discontinuous oil phase which comprises an organosilicon reaction product of (A) an organosilicon compound having at least one siliconbonded substituent of the general formula —R'—NHR", wherein R' is a divalent hydrocarbon group having no more than 8 carbon atoms, and R" denotes hydrogen, an alkyl group or a group of the general formula —R'NH$_2$ and (B) an organosilicon compound having at least one substituent of the general formula —R'—Y, wherein R' is as defined above and Y denotes an epoxy group containing moiety, whereby the molar ratio of amino groups in (A) to epoxy groups in (B) is greater than 1/1, there being present in the reaction product of (A) and (B) at least two silicon-bonded —OR groups, wherein R denotes an alkyl, aryl, alkoxyalkyl, alkoxyaryl or aryloxyalkyl group having no more than 8 carbon atoms, (II) one or more emulsifying agents and (III) a continuous water phase.

The oil phase (I) preferably comprises an amino functional organosiloxane, which may be a linear or a branched organosiloxane, consisting of units selected from $QSiO_{3/2}$, $Q_2SiO$, $Q_3SiO_{\frac{1}{2}}$ and $SiO_2$ and having at least two silicon-bonded —OR groups and one amino group of the formula —NHR" or —NH$_2$ per molecule, wherein R and R" are as defined above and Q denotes a hydrocarbon or substituted hydrocarbon group having from 1 to 18 carbon atoms. Amino group, where used herein refers to both primary and secondary amino groups, having the general formula —NH$_2$ and —NH— respectively. These organosiloxanes may vary from freely flowing liquids to viscous gum like materials. They may be substantially linear siloxanes having a viscosity in the range from 50 to 500,000 mPa.s, preferably 50 to 100,000 mPa.s, most preferably from 1000 to 5000 mPa.s. The Q substituent denotes for example alkyl e.g. methyl, ethyl, isopropyl, hexyl, octadecyl, aryl e.g. phenyl, aralkyl e.g. phenylmethyl and halogenated alkyl e.g. trifluoropropyl. Preferably the Q groups have no more than 8 carbon atoms. It is also preferred that at least 50%, more preferably 80% of all Q groups are methyl groups, any other groups being selected from other lower alkyl and aryl groups. In the preferred siloxane the amino functional substituent, having the general formula —R'—NHR", preferably comprises a primary amino group (—NH$_2$). The number of amino groups per molecule is not crucial, as long as there is at least one amino group which is free to react with the substrate e.g. the fibre surface to improve adhesion thereto. The amino group is linked to a silicon atom via a divalent R' group, preferably having 2 to 6 carbon atoms. Most preferably the amino group is linked via a propylene or isopropylene group to a silicon atom of the siloxane chain. Examples of suitable amino functional silicon-bonded substituents include —(CH$_2$)$_3$NH$_2$ and —(CH )$_2$NH(CH$_2$)$_3$NH$_2$. The reaction product of (A) and (B) must have at least two —OR groups linked to silicon atoms. These groups will allow crosslinking when exposed to the right conditions. The R group is an alkyl, aryl, alkoxyalkyl, alkoxyaryl or aryloxyalkyl group having no more than 8 carbon atoms, preferably an alkyl group, e.g. methyl, ethyl or butyl. By varying the size of the R group, the crosslinking reactivity of the organosiloxane in component (I), when applied to a substrate, can be modified. This method can be used to control the crosslinking rate of the elastomer-forming composition.

The organosilicon reaction product in the oil phase (I) is prepared by allowing to react together (A) an amino functional organosilicon compound with (B) an epoxy functional organosilicon compound. This reaction may occur between amino functional silanes and epoxy functional silanes, amino functional silanes and epoxy functional siloxanes, amino functional siloxanes and epoxy functional silanes or amino functional siloxanes and epoxy functional siloxanes. It is preferred that (A) is an amino functional siloxane, having more than one amino group per molecule and (B) is an epoxy functional silane. The molar ratio of amino groups to epoxy groups in the reaction mixture leading to the reaction product of (A) and (B) is to be larger than 1/1, in order to ensure that some amino functionality will be available in the organosilicon reaction product. By using starting materials (A) which have a number of amino groups per molecule, such ratio can be ensured by mixing in less than stoichiometric amounts of epoxy functional silicone compounds. If amino functional silanes are reacted with epoxy functional silanes, the reaction product can be further polymerised by reaction or equilibration with other silanes or siloxanes.

The silicon-bonded -OR groups present in the organosilicon reaction product in the oil phase (I) can conveniently be provided by using epoxy functional silanes having —OR groups linked to the silicon atom. Such silanes have the general formula $(RO)_aSiY_{3-a}$, wherein R is as defined above, a has a value of 1, 2 or 3 and Y is an epoxy functional group, e.g.

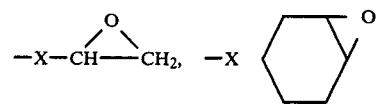

wherein X denotes a divalent hydrocarbon or halogenated hydrocarbon group, e.g. methylene, ethylene, propylene, phenylene and chloroethylene. Examples of the group Y include

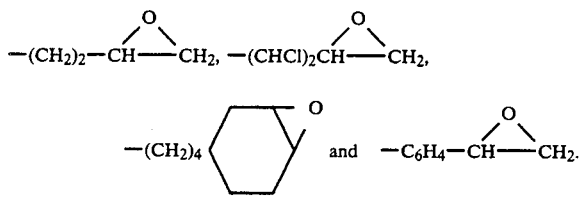

Preferably the ratio of amino functional groups to epoxy groups is such that up to 2/3 of the amino groups of the organosilicon compound (A) are reacted. Most preferably no more than about 50% of all amino groups are reacted with epoxy groups.

Component (II) of the microemulsions of the invention consists of one or more surfactants, which are insoluble in component (I). The surfactant (II) may be anionic, cationic, nonionic or amphoteric in nature. Generally nonionic surfactants are preferred. A secondary surfactant is usually preferred in addition. This secondary surfactant may be anionic, cationic, nonionic or amphoteric in nature and may be soluble or insoluble in component (I). Surfactants which are particularly useful in microemulsions of this invention have been described in detail in European Patent Specification 138 192, and include for example sorbitan esters of fatty acids having 10 to 22 carbon atoms, polyoxyethylene sorbitan esters of fatty acids, having up to 95% by weight ethylene oxide, fatty amino and amido betaines having 10 to 22 carbon atoms, polyoxyethylene condensates of fatty alcohols having 10 to 22 carbon atoms, alkali metal salts of dialkylsulfosuccinates and mono- and diethanolamides of fatty acids having 10 to 22 carbon atoms. The amount of surfactant used, should normally be sufficient to provide at least a mono-molecular layer of surfactant for component (I) in the dispersed phase. Amounts which provide excess of the mono-molecular layer may be used, and are indeed preferred. Generally the amount of surfactant should preferably be in the range of about 10 to 200 parts by weight per 100 parts by weight of component (I). Most preferably, the amount of surfactant should be in the range of about 20 to 40 parts by weight per 100 parts by weight of component (I).

The amount of water (III) used in the microemulsion is dependant on the required solids level of the emulsion.

The microemulsions of the present invention may also contain optional ingredients, for example antifreeze additives, biocides, organic softeners, antistatic agents, dyes and flame retardants. Unreacted components (A) and (B) may also be present in the microemulsion composition.

The present invention provides in another of its aspects a method of making microemulsions of an elastomer forming composition comprising a reaction product of (A) an organosilicon compound having at least one substituent of the general formula —R'—NHR", wherein R' is a divalent hydrocarbon group having no more than 8 carbon atoms and R" denotes hydrogen, an alkyl group or a group of the general formula —R'NH$_2$ and (B) an organosilicon compound having at least one substituent of the general formula —R'—Y, wherein R' is as defined above and Y denotes an epoxy group containing moiety, whereby the ratio of amino groups in (A) to epoxy groups in (B) is greater than 1/1, said reaction product having at least two silicon-bonded -OR groups wherein R denotes an alkyl, aryl, alkoxyalkyl, alkoxyaryl or aryloxyalkyl group having no more than 8 carbon atoms which comprises mixing organosilicon compound (A) with organosilicon compound (B), in proportions providing a ratio of amino groups to epoxy groups which is in excess of 1/1, allowing compound (A) to react with compound (B) and emulsifying the mixture or reaction product of (A) and (B) before a significant degree of crosslinking has taken place.

In order to provide for reaction between the amino functional silicon compound (A) and epoxy functional silicon compound (B), whilst avoiding excessive crosslinking of the reaction product or components (A) and (B) or of either of components (A) or (B) with the reaction product the emulsification step should be performed without undue delay following the mixing of (A) and (B). If the emulsification is delayed, gel particles may be formed resulting in an unsatisfactory finish on the fibrous material. Components (A) and (B) may be prereacted either at room temperature or at elevated temperatures. This is preferably done in an inert atmosphere to avoid premature crosslinking of the composition. The reaction product, which may still contain some unreacted compounds (A) and/or (B), may then be mixed with the emulsifiers and water in order to form the microemulsion. Preferably, however, the reaction of compounds (A) and (B) occurs during the manufacture of the microemulsion.

In this preferred method the organosilicon compounds (A) and (B), emulsifying agents and a small proportion of water are mixed together under continuous stirring. The amount of water used in this stage is generally sufficient to produce a translucent oil concentrate. The amount of water needed to form a clear concentrate depends upon the specific organosilicon compounds and surfactant used as well as their amounts. Typically the amount of water required to form a translucent oil concentrate will be in the range from 4 to 30 parts by weight per 100 parts by weight of component (I). The process is then followed by rapid dilution of the mixture with sufficient water to obtain the desired concentration of (I). Mixing ingredients (A) and (B) in this way allows them to react together, while minimising crosslinking and the undesired formation of gel particles. This method allows reacting (A) and (B) at elevated temperatures as is preferred. Preferably the reaction of (A) and (B) is carried out at temperatures of from 50 to 150° C. under inert atmospheric conditions for example under a blanket of nitrogen. After the reaction has proceeded to the desired extent the reaction mixture is preferably cooled quickly to room temperature or below, to reduce the reaction rate between (A) and (B). The use of an inert atmosphere and the speed of cooling after reaction become more important as the ratio of amino functional groups to epoxy functional groups increases. The use of water-free atmosphere is preferred as this reduces the undesired crosslinking reactions which take place. The more water is present the more likely premature crosslinking will take place. The microemulsion is generally translucent.

The invention also provides a method of treating fibrous materials with a silicone finish, which comprises applying to the materials a microemulsion of an elastomerforming silicone composition, comprising the reaction product of (A) an amino functional silicon compound and (B) an epoxy functional silicon compound as described above, thereafter effecting crosslinking or further crosslinking the elastomer-forming silicone composition.

The treatment may be carried out by conventional methods such as spraying, dipping, exhausting or padding. The microemulsions may be used as produced or they may be placed in a treatment bath diluted with water. Other ingredients such as catalysts may also be added. The concentration of the silicone components in the bath is preferably calculated to give the treated fibres a pick-up of up to 5% by weight, preferably from 3 to 4% by weight based on the weight of the fibres. The crosslinking is effected by heating the treated fibrous materials according to known techniques. Preferably the fibres are heated above 100° C. but at a temperature below the softening point of the fibrous materials if such point is applicable. Heat treatment is usually carried out at temperatures in the range of from 100 to 250° C. The treatment time is at least one second, and will be longer the lower the treatment temperature. Typically the fibrous materials will be treated for 10 seconds to 10 minutes depending on the treating temperature. Catalysts may be used to increase the crosslinking efficiency of the composition.

The process and compositions of this invention may be employed to treat a variety of fibres for example cotton, wool, polyester, cotton polyester mixtures, nylon and acrylic or fibre fill or fabrics which have been made from such fibres. The treatment is especially useful for textile fabrics. Fibres which have been treated according to the invention exhibit a very soft and smooth finish. The use of a microemulsion also usually ensures a more even finish due in part to a more even penetration of emulsion particles in the fibrous material. Due to the elastomeric nature of the finish, treated fabrics tend to be more resistant to tear and have an improved sewability. The crease recovery of a finished fabric article is also improved.

There now follow a number of examples which illustrate the invention.

EXAMPLE 1

200g of an amino functional polydimethylsiloxane having about 400 silicon atoms per molecule and 2.25 mole % amino groups present as silicon-bonded —$(CH_2)_2NH(CH_2)_3NH_2$, were stirred in a flask over which a nitrogen blanket passed. 6.9g of glycidoxypropyl trimethoxy silane was added with stirring. The resulting mixture was heated to about 90° C. for 1 hour, after which it was allowed to cool to room temperature. 150g of the reaction product was mixed with 20g of SURF T7 (an 7-EO ethoxylated secondary alcohol having 12-14 carbon atoms), 30g of SURF T5 (a 5-EO ethoxylated secondary alcohol having 12-14 carbon atoms) and 35.2g of water to make a thick emulsion phase. This was diluted rapidly in three stages with 50, 216 and 493.6g of water respectively, resulting in a microemulsion having 15% organosiloxane wherein 16.7% of the originally available NH groups had reacted with the epoxy functional silane.

EXAMPLE 2

When repeating the first example, but doubling the amount of glycidoxypropyl trimethoxy silane, in order to react with about 33% of the available NH groups gelling of the reaction product occurred, unless the reaction mixture was cooled very quickly by immersion of the reaction vessel in a water bath and the nitrogen flow was increased during the cooling stage.

EXAMPLE 3

The procedure of Example 2 was repeated except that sufficient glycidoxypropyl trimethoxy silane was added to react with 50% of the available NH groups, and that the aminofunctional siloxane was heated to 90° C. before the silane was added. The product was a clear microemulsion.

EXAMPLE 4

A treating bath was prepared by diluting 740.7g of a microemulsion prepared as in Example 1 with 259.3g of water. 25g of polyester fibre fill fibres were soaked in the bath, spun dry for 1 minute and heated at 160° C. for 7 minutes in a ventilated oven. The treated fibres were found to have a good handle and soft finish.

EXAMPLE 5

The procedure of Example 4 was repeated except that a microemulsion prepared as in Example 2 was used. Treated fibre fill was cured for an additional 2 minutes at 195° C. The results were similar to those of Example 4.

EXAMPLE 6

The procedure of Example 5 was repeated except that only 240.8g of water was used, and 18.5g of a 20% solution of dibutyl tin bis(lauryl) mercaptide was used as a catalyst. Treated fibre fill gave a better handle and substantivity of the fibre than was the case in Example 5.

EXAMPLE 7

A piece of polycotton was treated in a bath similar to the one described in Example 4. After treatment the fabric was dried at 110° C. for 1 minute followed by heating at 150° C. for 2 minutes in order to cure the composition on the fibres. The treated fabric was found to have a good handle. Upon washing the fabric five times in a commercial front-loading washing machine at 60° C. with powder detergent the piece of fabric had only lost a little of its softness.

That which is claimed is:

1. An oil-in-water microemulsion comprising a discontinuous oil phase (I), one or more emulsifying agents (II) and a continuous water phase (III) wherein the oil phase (I) comprises a reaction product of (A) an organosilicon compound having at least one silicon-bonded substituent of the general formula —R'—NHR", wherein R' is a divalent hydrocarbon group having up to 8 carbon atoms, and R" is selected from the group consisting of hydrogen, alkyl groups and groups of the general formula —R'NH$_2$, and (B) an organosilicon compound having at least one substituent of the general formula —R'—Y, wherein R' is as defined above and Y denotes an epoxy group containing moiety, whereby the molar ratio of amino groups in (A) to epoxy groups in (B) is greater than 1/1, wherein one of the compounds (A) or (B) is a silane, and the other is a siloxane there being present in the reaction product at least two silicon-bonded —OR groups, wherein R is selected from the group consisting of alkyl, aryl, alkoxyalkyl, alkoxyaryl and aryloxyalkyl groups having up to 8 carbon atoms.

2. A microemulsion according to claim 1 wherein the reaction product is an amino functional organosiloxane consisting of units selected from QSiO$_{3/2}$, Q$_2$SiO, Q$_3$SiO$_\frac{1}{2}$ and SiO2 and having at least two silicon-bonded —OR groups and one amino group of the formula —NHR" or —NH$_2$ per molecule, wherein R and R" are as defined above and Q is selected from the group consisting of a hydrocarbon and substituted hydrocarbon groups having from 1 to 18 carbon atoms.

3. A microemulsion according to claim 1 wherein (A) is an amino functional siloxane having more than one amino group per molecule, with (B) an epoxy functional silane.

4. A microemulsion according to claim 3 wherein (B) is a silane of the general formula $(RO)_aSiY_{3-a}$ wherein R and Y are as defined above and a has a value of 1, 2 or 3.

5. A microemulsion according to claim 1 wherein no more than 50% of all amino groups provided by (A) are reacted with epoxy groups provided by (B).

6. A microemulsion according to claim 2 wherein no more than 50% of all amino groups provided by (A) are reacted with epoxy groups provided by (B).

7. A microemulsion according to claim 4 wherein no more than 50% of all amino groups provided by (A) are reacted with epoxy groups provided by (B).

8. A method of treating fibrous materials which comprises applying to the fibrous materials a microemulsion according to claim 1 followed by effecting the crosslinking of the elastomer-forming composition.

9. A method according to claim 8 in which the crosslinking is effected by heat treatment of the treated fibrous materials.

10. Fibrous materials when treated according to the method of claim 8.

11. Textile materials when treated according to the method of claim 8.

* * * * *